United States Patent
Onimaru et al.

(10) Patent No.: US 8,114,312 B2
(45) Date of Patent: Feb. 14, 2012

(54) DISPLAY DEVICE AND GREEN PHOSPHOR

(75) Inventors: Toshiaki Onimaru, Kawasaki (JP);
Shinya Fukuta, Kawasaki (JP);
Tomonari Misawa, Kawasaki (JP);
Hironori Sakata, Kawasaki (JP); Shigeo Kasahara, Kawasaki (JP)

(73) Assignee: Hitachi Plasma Patent Licensing Co., Ltd., Tokyo (JP)

( * ) Notice: Subject to any disclaimer, the term of this patent is extended or adjusted under 35 U.S.C. 154(b) by 861 days.

(21) Appl. No.: 11/885,123

(22) PCT Filed: Feb. 28, 2005

(86) PCT No.: PCT/JP2005/003312
§ 371 (c)(1),
(2), (4) Date: Aug. 6, 2008

(87) PCT Pub. No.: WO2006/092838
PCT Pub. Date: Sep. 8, 2006

(65) Prior Publication Data
US 2008/0315750 A1 Dec. 25, 2008

(51) Int. Cl.
*C09K 11/86* (2006.01)
*H05B 33/14* (2006.01)
*H05B 33/12* (2006.01)

(52) U.S. Cl. .......... 252/301.6 R; 252/301.4 R; 313/582; 313/584; 313/586

(58) Field of Classification Search ........... 252/301.4 R, 252/301.6 R; 313/486, 582, 584
See application file for complete search history.

(56) References Cited

U.S. PATENT DOCUMENTS

| | | | |
|---|---|---|---|
| 7,294,956 B2 * | 11/2007 | Maeda et al. ................ | 313/486 |
| 2003/0232005 A1 | 12/2003 | Okada et al. | |
| 2004/0084656 A1 | 5/2004 | Imanari et al. | |

FOREIGN PATENT DOCUMENTS

| | | |
|---|---|---|
| JP | 2001-348570 | 12/2001 |
| JP | 2002-173677 | 6/2002 |
| JP | 2002-275464 * | 9/2002 |
| JP | 2003-327959 | 11/2003 |
| JP | 2004-143375 | 5/2004 |
| JP | 2004-175986 | 6/2004 |
| JP | 2004-204216 | 7/2004 |
| WO | WO 03/032407 * | 4/2003 |
| WO | WO 03/032407 A1 | 4/2003 |
| WO | WO 03-032407 A1 | 4/2003 |

OTHER PUBLICATIONS

European Search Report issued in European Patent Application No. 05726578.7, mailed Mar. 25, 2009.

* cited by examiner

*Primary Examiner* — Carol M Koslow
(74) *Attorney, Agent, or Firm* — McDermott Will & Emery LLP

(57) ABSTRACT

A display device comprising at least one phosphor layer, the phosphor layer containing a green phosphor represented by the following formula: $(A_{1-x}B_x)(Zn_{1-y}Mn_y)Al_{10}O_{17}$ wherein, A is an element selected from Ca, Ba and Sr, B is a rare-earth element, x is a number satisfying $0.0001 \leq x \leq 0.1$, and y is a number satisfying $0.02 \leq y \leq 0.14$.

5 Claims, 5 Drawing Sheets

DISPLAY DEVICE AND GREEN PHOSPHOR

RELATED APPLICATIONS

This application is the U.S. National Phase under 35 U.S.C. §371 of International Application No. PCT/JP2005/003312, filed on Feb. 28, 2005, the disclosure of which Application is incorporated by reference herein.

TECHNICAL FIELD

The present invention relates to a display device and a green phosphor. More particularly, the present invention relates to a display device such as a plasma display panel (PDP) equipped with a phosphor layer containing a green phosphor, and a green phosphor capable of converting irradiated light into light having lower energy (long wavelength).

BACKGROUND ART

A phosphor is used broadly in various fields. For example, the phosphor is used as a phosphor for a lighting device such as a fluorescent lamp, a phosphor for a display device such as a PDP, and a phosphor for an x-ray pickup tube. For example, in a color display device, three-color phosphors of red, blue and green are used in general, and white can be obtained by combining fluorescence from the three-color phosphors. In particular, because the green phosphor is an important phosphor to determine luminance of white, an offer of a green phosphor that generates fluorescence having high luminance and high color purity is desired.

$(Ba, Mn)Al_{12}O_{19}$, $(Y, Tb)BO_3$ and $Zn_2SiO_4$: Mn are well known as conventional green phosphors. Further, as a blue phosphor, a phosphor represented by $BaMgAl_{10}O_{17}$: $Eu^{2+}$ (a part of Mg is substituted with Ca, Cu, Zn, Pb, Cd, Mg or Sn) is also known (Japanese Unexamined Patent Application No. 2002-173677: Patent Document 1).

Patent Document 1: Japanese Unexamined Patent Application No. 2002-173677

DISCLOSURE OF THE INVENTION

Problems to be Solved by the Invention

In the above-described green phosphors, there is a problem that $(Ba, Mn)Al_{12}O_{19}$ has low luminance although it has high color purity. On the other hand, there is a problem that $(Y, Tb)BO_3$ has low color purity, but has high luminance.

$Zn_2SiO_4$: Mn has a good balance of color purity and luminance compared with the above-described green phosphors, and is often used in a display device such as a PDP.

However, the color purity and the luminance of $Zn_2SiO_4$: Mn is not sufficient, and further improvement of the color purity and the luminance has been desired.

Means for Solving the Problems

Thus, according to the present invention, there is provided a display device comprising at least one phosphor layer, the phosphor layer containing a green phosphor represented by the following formula:

$(A_{1-x}B_x)(Zn_{1-y}Mn_y)Al_{10}O_{17}$ wherein, A is an element selected from Ca, Ba and Sr, B is a rare-earth element, x is a number satisfying $0.0001 \leq x \leq 0.1$, and y is a number satisfying $0.02 \leq y \leq 0.14$.

Furthermore, according to the present invention, there is provided a green phosphor represented by the following formula:

$(A_{1-x}B_x)(Zn_{1-y}Mn_y)Al_{10}O_{17}$ wherein, A is an element selected from Ca, Ba and Sr, B is a rare-earth element, x is a number satisfying $0.0001 \leq x \leq 0.1$, and y is a number satisfying $0.02 \leq y \leq 0.14$.

Effects of the Invention

According to the present invention, there can be provided the display device, in which the green phosphor excellent in characteristics such as color purity, luminance and lifetime, especially color purity, is contained in the phosphor layer.

EXPLANATION OF REFERENCE NUMERALS

Figure 1:
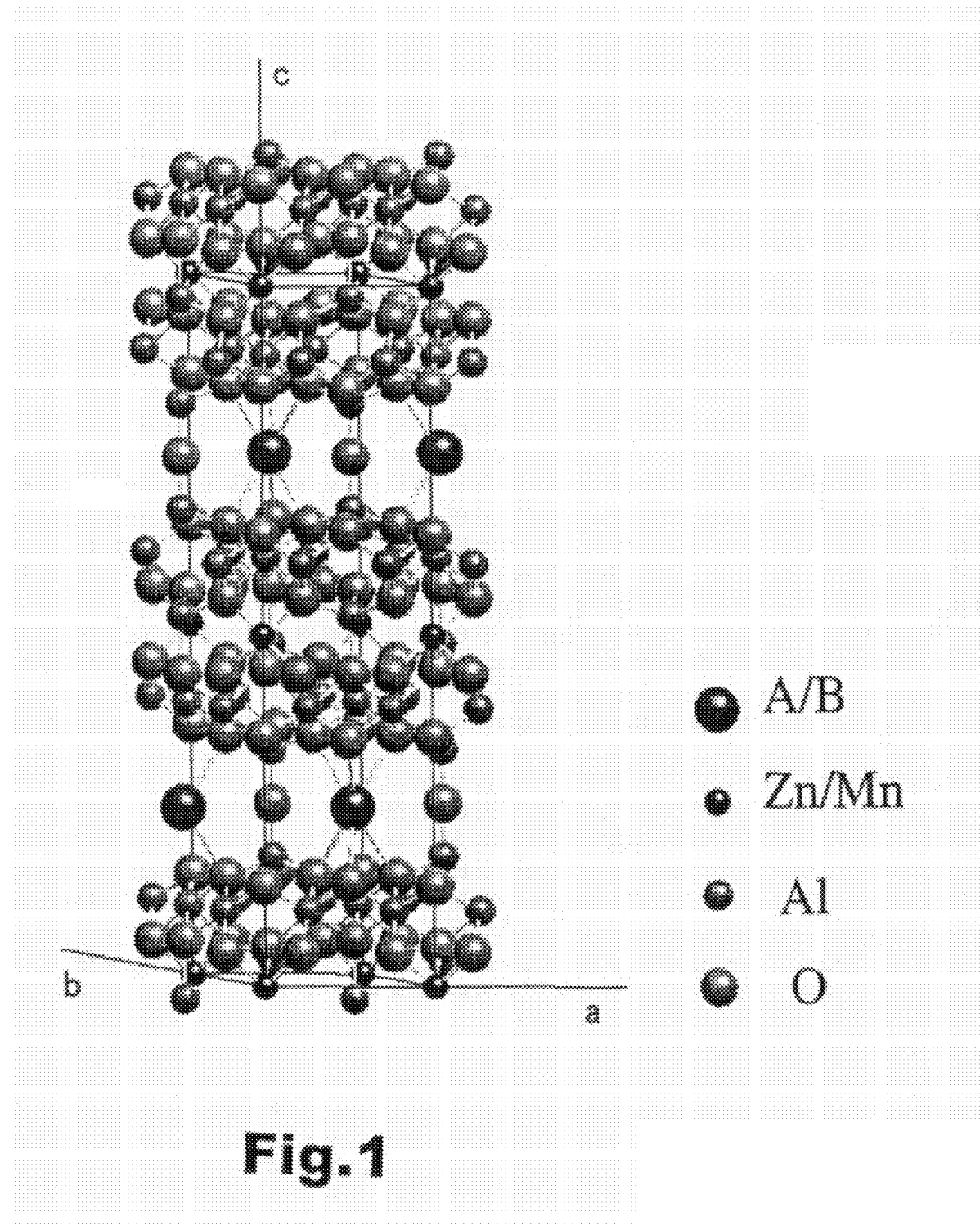
FIG. 1 is a schematic view of the β alumina structure.

| | |
|---|---|
| 11, 21 | substrate |
| 17, 27 | dielectric layer |
| 18 | protective layer |
| 28 | phosphor layer |
| 29 | rib |
| 30 | space |
| 41 | transparent electrode |
| 42 | bus electrode |
| 100 | PDP |
| A | address electrode |

BEST MODE FOR CARRYING OUT THE INVENTION

First, a display device of the present invention is a display device having at least one phosphor layer, in which the phosphor layer contains a green phosphor represented by the following formula:

$(A_{1-x}B_x)(Zn_{1-y}Mn_y)Al_{10}O_{17}$ wherein, A is an element selected from Ca, Ba and Sr, B is a rare-earth element, x is a number satisfying $0.0001 \leq x \leq 0.1$, and y is a number satisfying $0.02 \leq y \leq 0.14$. Moreover, "x" and "y" mean a molar ratio (an atomic ratio).

"A" in the above-described formula may be at least any one of Ca, Ba and Sr, and may contain two or all of these elements. Specifically, combinations of Ca/Ba, Ca/Sr, Ba/Sr and Ca/Ba/Sr are given.

"B" in the above-described formula is a rare-earth element such as La, Pr, Nd, Pm, Sm, Eu, Gd, Dy, Ho, Er, Tm, Yb, Lu, Hf, Ce, Tb and Y. Among the above-described elements, more preferable rare-earth elements are Gd, Lu, Yb and Y, further Gd and Y are especially preferable.

It is not preferable that "x" is smaller than 0.0001 because an increase of luminance is not observed, and it is not preferable that x is larger than 0.1 because the luminance decreases. It is more preferable that "x" is 0.001 to 0.007. Furthermore, in specific, in the case that "B" is Gd, the range of 0.0001 to 0.02 is especially preferable, in the case of Lu, the range of 0.0001 to 0.03 is especially preferable, in the case of Yb, the range of 0.0001 to 0.015 is especially preferable, and in the case of Y, the range of 0.0001 to 0.05 is especially preferable.

It is not preferable that "y" is smaller than 0.02 and larger than 0.14 because there is the case that the luminance is lower than $Zn_2SiO_4$: Mn, which is the conventional green phosphor. More preferably, "y" is a range of 0.04 to 0.10.

Specifically, $(Ba_{1-x}Gd_x)(Zn_{1-y}Mn_y)Al_{10}O_{17}$, $(Ba_{1-x}Lu_x)(Zn_{1-y}Mn_y)Al_{10}O_{17}$, $(Ba_{1-x}Yb_x)(Zn_{1-y}Mn_y)Al_{10}O_{17}$ and $(Ba_{1-x}Y_x)(Zn_{1-y}Mn_y)Al_{10}O_{17}$ are exemplified.

Next, "A" may contain both Ba and Sr. Therefore, the green phosphor containing both can be represented by the following formula:

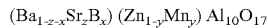

$(Ba_{1-z-x}Sr_zB_x)(Zn_{1-y}Mn_y)Al_{10}O_{17}$ wherein, A, B, x and y are the same definition as described above, and z is a number satisfying 0<z<1.

Specifically, $(Ba_{1-z-x}Sr_zGd_x)(Zn_{1-y}Mn_y)Al_{10}O_{17}$ is exemplified.

Here, the inventors have found that the luminance of the green phosphor improves by "A" containing Sr. In particular, in the case that "A" contains Sr, in which "z" is in a range of 0.25 to 0.45, the green phosphor having both high luminance and high color purity can be obtained.

Moreover, a part of Zn may be substituted with Mg within a range, in which the effect of the above-described green phosphor is not hindered. Furthermore, the above-described green phosphor has $AZnAl_{10}O_{17}$ as a mother material and Mn as a center of emission. Other mother materials such as $CaAl_{12}O_{19}$ and $SrAl_{12}O_{19}$ may be mixed with the mother material at an appropriate ratio to form a mixed crystal.

A crystal structure of the above-described green phosphor is not especially limited as long as the phosphor has higher luminance and higher color purity than the conventional green phosphor. However, with the mother material and the center of emission constituting the green phosphor, in the case that the mother material has β alumina structure shown in FIG. 1, it is found that there are many green phosphors showing high luminance and high color purity.

A wavelength of light irradiated to bring out fluorescence from the above-described green phosphor is not especially limited. In the case of a display device such as a plasma display panel (PDP), a wavelength in a vacuum ultraviolet region (for example, 147 nm and 172 nm) is preferable.

Furthermore, other green phosphors below may be mixed into the above-described green phosphor:

(1) A green phosphor having a magnetoplumbite type crystal structure containing at least Mn, La and Tb;

(2) A green phosphor having a magnetoplumbite type crystal structure containing at least Tb and La, and not containing Ce; and (3) A green phosphor having a magnetoplumbite type crystal structure containing at least Mn, La and Zn.

Many of these other green phosphors have larger luminance than the above-described green phosphor, and by mixing with the above-described green phosphor, both the color purity and luminance can be improved further.

Specific examples of the other green phosphors include:
$LaMgAl_{11}O_{19}$: Mn,Tb, $La_xAl_yO_z$ (x:y:z=0.5 to 1.2:11 to 12:18 to 19.5), etc. on (1), $LaMgAl_{11}O_{19}$: Tb, $LaMgAl_{11}O_{19}$: Mn,Tb, etc. on (2), and
$LaMgAl_{11}O_{19}$, $(La_{1-x}Tb_x)_y(Mg_{1-a-b}Mn_aZn_b)Al_zO_{1.5(z+y)+1}$ (in the formula, $0 \leq x \leq 0.5$, $0.8 \leq y \leq 1.2$, $0 \leq a+b \leq 1$ and $8 \leq z \leq 30$), etc. on (3).

The above-described green phosphor can be formed with a well known method. For example, compounds containing A, Zn, Mn and Al are weighted so as to be a desired molar ratio. These compounds are sintered. Subsequently, by grinding and classifying the obtained sintered body of the green phosphor, a green phosphor having a predetermined particle diameter can be obtained.

Specifically, sintering is preferably performed at a sintering temperature of 1300 to 1700° C. for 1 to 10 hours in a nitrogen atmosphere. Moreover, in order to lower the sintering temperature, a reaction promoter consisting of halides such as $AlF_3$, $MgF_2$, LiF and NaF may be used within a range of not disturbing the effect of the present invention.

Moreover, other green phosphors can be formed in the same way as the above-described green phosphor.

A display device in the present invention includes a PDP, a CRT, a fluorescent display tube, and an x-ray pickup tube. A PDP in FIG. 2 is described below as one example of the display device in the present invention.

Figure 2:
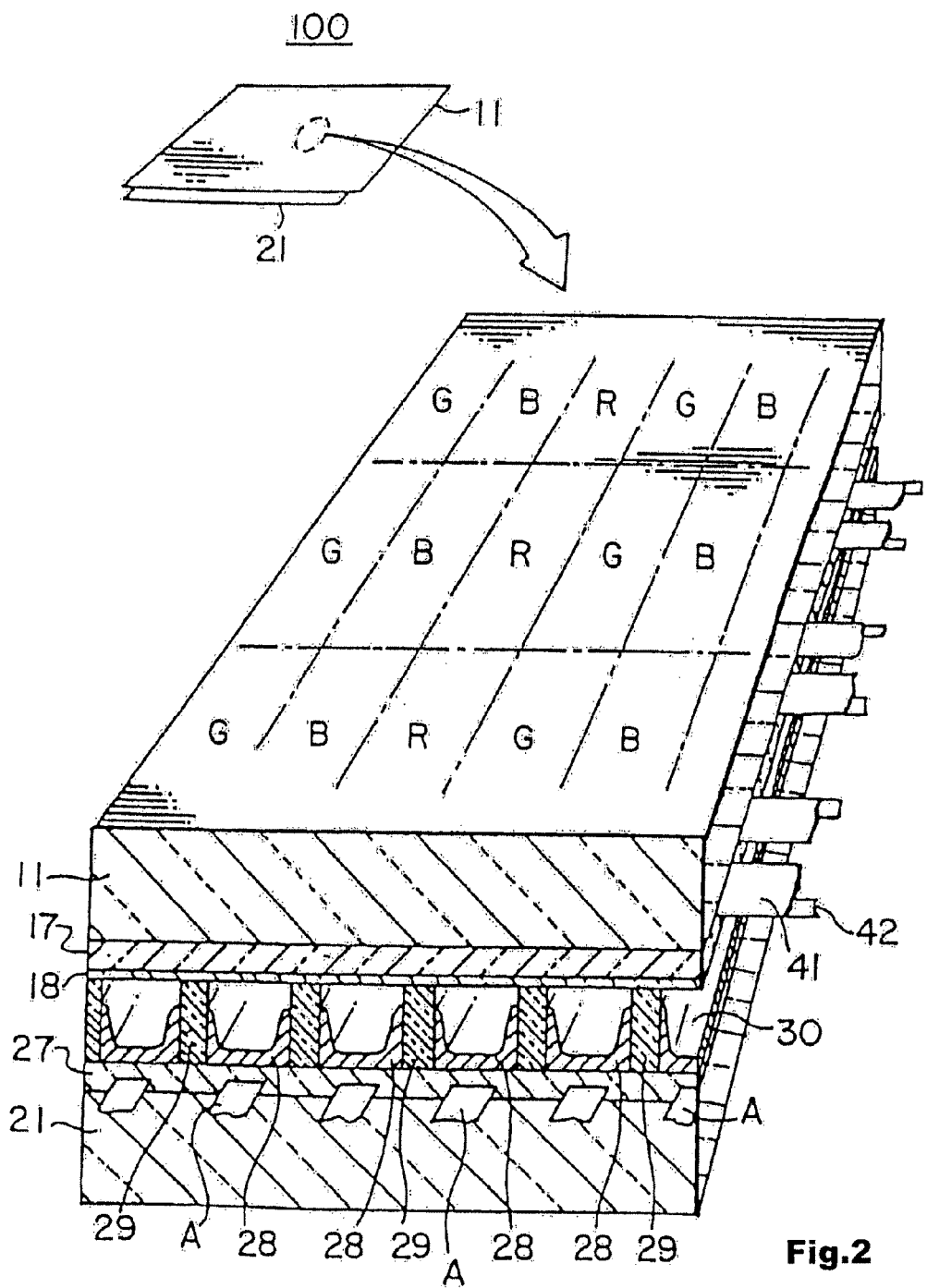
FIG. 2 is a schematic perspective view of a PDP.

The PDP in FIG. 2 is a three-electrode AC type surface discharge PDP. Moreover, the present invention is not limited to this PDP, and can be applied to any configuration if the PDP contains a green phosphor. For example, the PDP is not limited to an AC type and may use a DC type, and may be used in any PDPs of a reflection type and a transmission type.

A PDP 100 in FIG. 2 is configured with a front substrate and a rear substrate.

First, the front substrate generally comprises a plurality of display electrodes formed on a substrate 11, a dielectric layer 17 formed so as to cover the display electrodes, and a protective layer 18 formed on the dielectric layer 17 and exposed to a discharge space.

The substrate 11 is not especially limited, and includes a quartz glass substrate, a glass substrate, and a silicon substrate.

The display electrode comprises a transparent electrode 41 such as ITO. Further, in order to lower resistance of the display electrode, a bus electrode (for example, a three-layer structure of Cr/Cu/Cr) 42 may be formed on the transparent electrode 41.

The dielectric layer 17 is formed from a material used normally in a PDP. Specifically, the dielectric layer can be formed by applying a paste including a low melting point glass and a binder on the substrate and sintering the obtained substrate.

The protective layer 18 is provided to protect the dielectric layer 17 from damage due to a collision of ions generated by a discharge when displaying. The protective layer 18 comprises MgO, CaO, SrO, BaO, etc. for example.

Next, the rear substrate generally comprises a plurality of address electrodes A formed on a substrate 21 in the direction crossing with the above-described display electrodes, a dielectric layer 27 covering the address electrodes A, a plurality of striped ribs 29 formed on the dielectric layer 27 between the adjacent address electrodes A, and a phosphor layer 28 formed between the ribs 29 including sides of the walls.

The same kinds as the substrate 11 and the dielectric layer 17 configuring the above-described front substrate can be used for the substrate 21 and the dielectric layer 27.

The address electrode A comprises a metal layer such as Al, Cr and Cu, and a three-layer structure of Cr/Cu/Cr for example.

The rib 29 can be formed by applying a paste including a low melting point glass and a binder on the dielectric layer 27, drying, and then cutting off with a sandblasting method. Further, in the case of using a photosensitive resin to the binder, the rib can be formed by exposing using a mask of a predetermined shape, developing, and then sintering.

In FIG. 2, the phosphor layer 28 is formed between the ribs 29, and the above-described green phosphor can be used as a raw material of this phosphor layer 28. A forming method of the phosphor layer 28 is not especially limited, and a well known method can be mentioned. For example, the phosphor layer 28 can be formed by applying a paste, in which a phosphor is dispersed in a solution obtained by dissolving a binder in a solvent, between the ribs 29 and sintering under an air atmosphere.

Next, the PDP 100 can be formed by making the above-described front substrate and the rear substrate to oppose each other with display electrodes (41 and 42) and the address electrode A facing an inner side so that the both display electrodes are orthogonal to the address electrodes A, and by filling discharge gas in space 30 surrounded with the rib 29.

Moreover, in the above-described PDP, the phosphor layer is formed, in the rib, on the dielectric layer and the protective film prescribing the discharge space, and on the rib and the dielectric layer of the rear substrate side. However, the phosphor layer may be formed also on the protective film of the front substrate side with the same method.

EXAMPLES

Hereinbelow, Examples in the present invention are explained. Moreover, the present invention is not limited to Examples below.

Example 1

An appropriate amount of ethanol was added to each of raw materials of molar ratio below to mix for 3 hours.

TABLE 1

| | Molar ratio | | |
|---|---|---|---|
| Materials | Phosphor a | Phosphor b | Phosphor c |
| $BaCO_3$ | 1 | 0.997 | 0.99 |
| $Gd_2O_3$ | 0 | 0.0015 | 0.005 |
| $Al_2O_3$ | 5 | 5 | 5 |
| ZnO | 0.97 | 0.97 | 0.97 |
| $MnCO_3$ | 0.03 | 0.03 | 0.03 |
| $AlF_3$ | 0.03 | 0.03 | 0.03 |

The obtained mixture was fired at 1300° C. under a nitrogen atmosphere for 4 hours and the obtained sintered body was ground to prepare phosphors "a" to "c" represented with $(Ba_{1-x}Gd_x)(Zn_{0.97}Mn_{0.03})Al_{10}O_{17}$ ($0.01 \leq x \leq 0.3$). The obtained phosphors were confirmed to be a crystal having a β alumina structure by x-ray diffraction.

Figure 3:
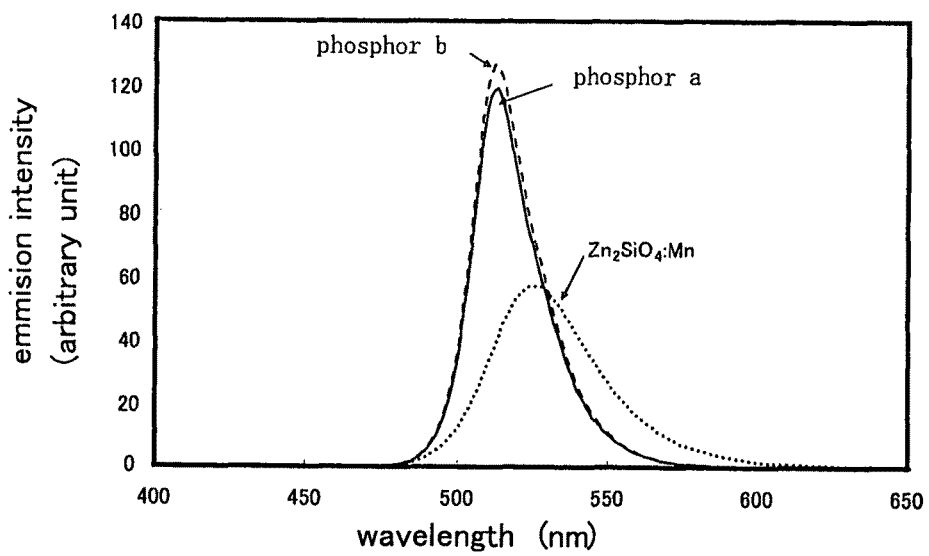
FIG. 3 is an emission spectrum of the phosphor of Example 1.

FIG. 3 shows an emission spectrum when light of 147 nm was irradiated to the phosphor "b". From FIG. 3, it is found that the phosphor "b" shows green emission. Further, it is found that an emission intensity of the phosphor "b" is about two times larger than that of $(Zn, Mn)_2SiO_4$. Furthermore, it is found that it is about 10% larger than that of $Ba(Zn_{0.97}Mn_{0.03})Al_{10}O_{17}$ (phosphor "a").

Phosphors "d" to "i" were prepared in the same manner as described above except that Gd was changed to Lu, Yb or Y. A molar ratio of raw materials of the phosphors "d" to "i" are shown in Table 2 below.

TABLE 2

| | Molar ratio | | | | | |
|---|---|---|---|---|---|---|
| Materials | Phosphor d | Phosphor e | Phosphor f | Phosphor g | Phosphor h | Phosphor i |
| $BaCO_3$ | 0.997 | 0.99 | 0.997 | 0.99 | 0.997 | 0.99 |
| $Lu_2O_3$ | 0.0015 | 0.005 | 0 | 0 | 0 | 0 |
| $Yb_2O_3$ | 0 | 0 | 0.0015 | 0.005 | 0 | 0 |
| $Y_2O_3$ | 0 | 0 | 0 | 0 | 0.0015 | 0.005 |
| $Al_2O_3$ | 5 | 5 | 5 | 5 | 5 | 5 |
| ZnO | 0.97 | 0.97 | 0.97 | 0.97 | 0.97 | 0.97 |
| $MnCO_3$ | 0.03 | 0.03 | 0.03 | 0.03 | 0.03 | 0.03 |
| $AlF_3$ | 0.03 | 0.03 | 0.03 | 0.03 | 0.03 | 0.03 |

Figure 4:
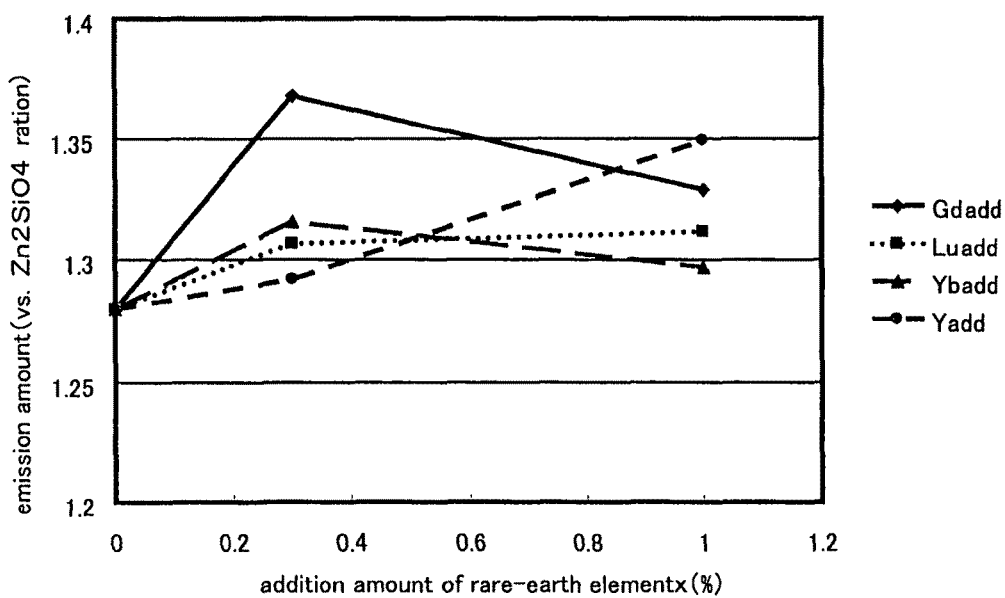
FIG. 4 is a graph for showing the rare-earth element concentration dependence of the emission amounts of the phosphor in Example 1.

Furthermore, emission amounts of the phosphors "a" to "i" were measured, and the emission amounts are shown in FIG. 4 as a ratio to the emission amount of $(Zn, Mn)_2SiO_4$ being 1. Further, chromaticity coordinates (x, y) of each phosphor are shown in Table 3 together with the emission amount.

TABLE 3

| | Rare-earth element | Addition amount | Chromaticity Coordinate X | Chromaticity Coordinate Y | Emission amount |
|---|---|---|---|---|---|
| $Zn_2SiO_4$:Mn | | | 0.226 | 0.710 | 1.00 |
| Phosphor a | | | 0.111 | 0.749 | 1.28 |
| Phosphor b | Gd | 0.003 | 0.112 | 0.747 | 1.37 |
| Phosphor c | Gd | 0.01 | 0.113 | 0.749 | 1.33 |
| Phosphor d | Lu | 0.003 | 0.116 | 0.742 | 1.31 |
| Phosphor e | Lu | 0.01 | 0.113 | 0.748 | 1.31 |
| Phosphor f | Yb | 0.003 | 0.113 | 0.744 | 1.32 |
| Phosphor g | Yb | 0.01 | 0.112 | 0.747 | 1.30 |
| Phosphor h | Y | 0.003 | 0.115 | 0.743 | 1.29 |
| Phosphor i | Y | 0.01 | 0.114 | 0.744 | 1.35 |

From FIG. 4, it is found that, in the case of Gd, the range of 0.0001 to 0.02 is preferable, in the case of Lu, the range of 0.0001 to 0.03 is preferable, in the case of Yb, the range of 0.0001 to 0.015 is preferable, and in the case of Y, the range of 0.0001 to 0.05 is preferable. Further, it is found that the phosphors "b" to "i" within the range of "x" in the present invention also have chromaticity coordinates of (0.112 to 0.16, 0.742 to 0.749) that are closer to green (about 0.08, 0.83) than (0.226, 0.710) of $(Zn, Mn)_2SiO_4$, and have a high color purity.

Example 2

Phosphors "j" to "l" were prepared in the same manner as Example 1 using raw materials of molar ratio below. The phosphor "b" is the same as Example 1.

TABLE 4

| | Molar ratio | | | |
|---|---|---|---|---|
| Materials | Phosphor b | Phosphor j | Phosphor k | Phosphor l |
| $BaCO_3$ | 0.997 | 0.747 | 0.647 | 0.497 |
| $Gd_2O_3$ | 0.0015 | 0.0015 | 0.0015 | 0.0015 |
| $SrCO_3$ | 0 | 0.25 | 0.35 | 0.50 |
| $Al_2O_3$ | 5 | 5 | 5 | 5 |
| ZnO | 0.97 | 0.97 | 0.97 | 0.97 |
| $MnCO_3$ | 0.03 | 0.03 | 0.03 | 0.03 |
| $AlF_3$ | 0.03 | 0.03 | 0.03 | 0.03 |

Figure 5:
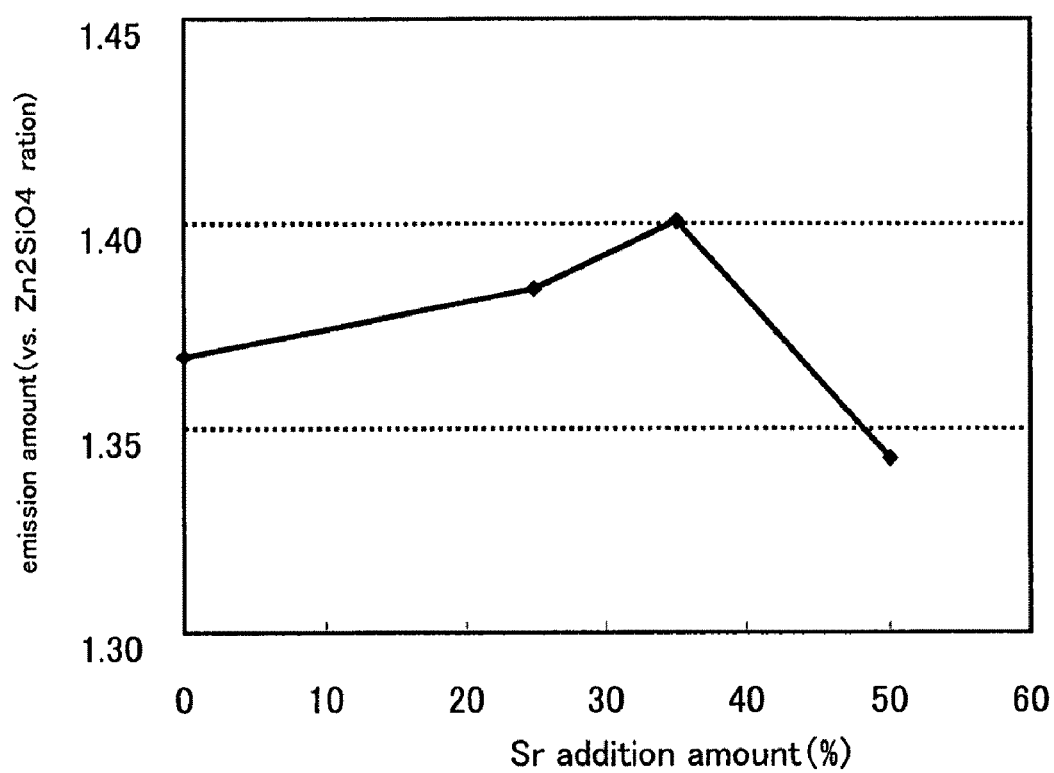
FIG. 5 is a graph for showing the Sr concentration dependence of the emission amounts of the phosphor in Example 2.

The emission amounts of the phosphors "b" and "j" to "l" were measured, and are shown in FIG. 5 as a ratio to the emission amount of $(Zn, Mn)_2SiO_4$ being 1. Further, the chromaticity coordinates (x, y) of each phosphor are shown in Table 5 together with the emission amount.

TABLE 5

|  | Gd (Molar ratio) | Sr (Molar ratio) | Chromaticity Coordinate X | Chromaticity Coordinate Y | Emission amount |
|---|---|---|---|---|---|
| Zn$_2$SiO$_4$:Mn |  |  | 0.226 | 0.710 | 1.00 |
| Phosphor b | 0.003 | 0 | 0.112 | 0.747 | 1.37 |
| Phosphor j | 0.003 | 0.25 | 0.115 | 0.749 | 1.38 |
| Phosphor k | 0.003 | 0.35 | 0.118 | 0.748 | 1.40 |
| Phosphor l | 0.003 | 0.50 | 0.115 | 0.757 | 1.34 |

From FIG. 5, it is found that the emission amount can be increased further by containing Sr. In particular, it is found that the emission amount can be increased remarkably by containing Sr in the range of 0 to 0.45.

Further, it is found that the phosphors "j" to "l" also have chromaticity coordinates of (0.115 to 0.118, 0.748 to 0.757) that are closer to green (about 0.08, 0.83) than (0.226, 0.710) of (Zn, Mn)$_2$SiO$_4$, and have a high color purity.

Example 3

A PDP having a configuration below were prepared using a phosphor "k" [(Ba$_{0.647}$Gd$_{0.003}$Sr$_{0.35}$) (Zn$_{0.97}$Mn$_{0.03}$)Al$_{10}$O$_{17}$] and BAM. Configuration of PDP:

Display electrodes width of a transparent electrode: 280 μm, width of a bus electrode 100 μm
Discharge gap between the display electrodes 100 μm
Thickness of the dielectric layer 30 μm
Height of the rib 100 μm
Arranging pitch of the rib 360 μm
Discharge gas Ne—Xe (5%)
Gas pressure 500 Torr The obtained PDP was lighted up continuous for 500 hours as an accelerated lifetime test, and peak intensity was measured at the lighting of every hour. The obtained peak intensities are shown in FIG. 6 as relative peak intensities when the peak intensity when it is initially lighted is set to 1.

Figure 6:
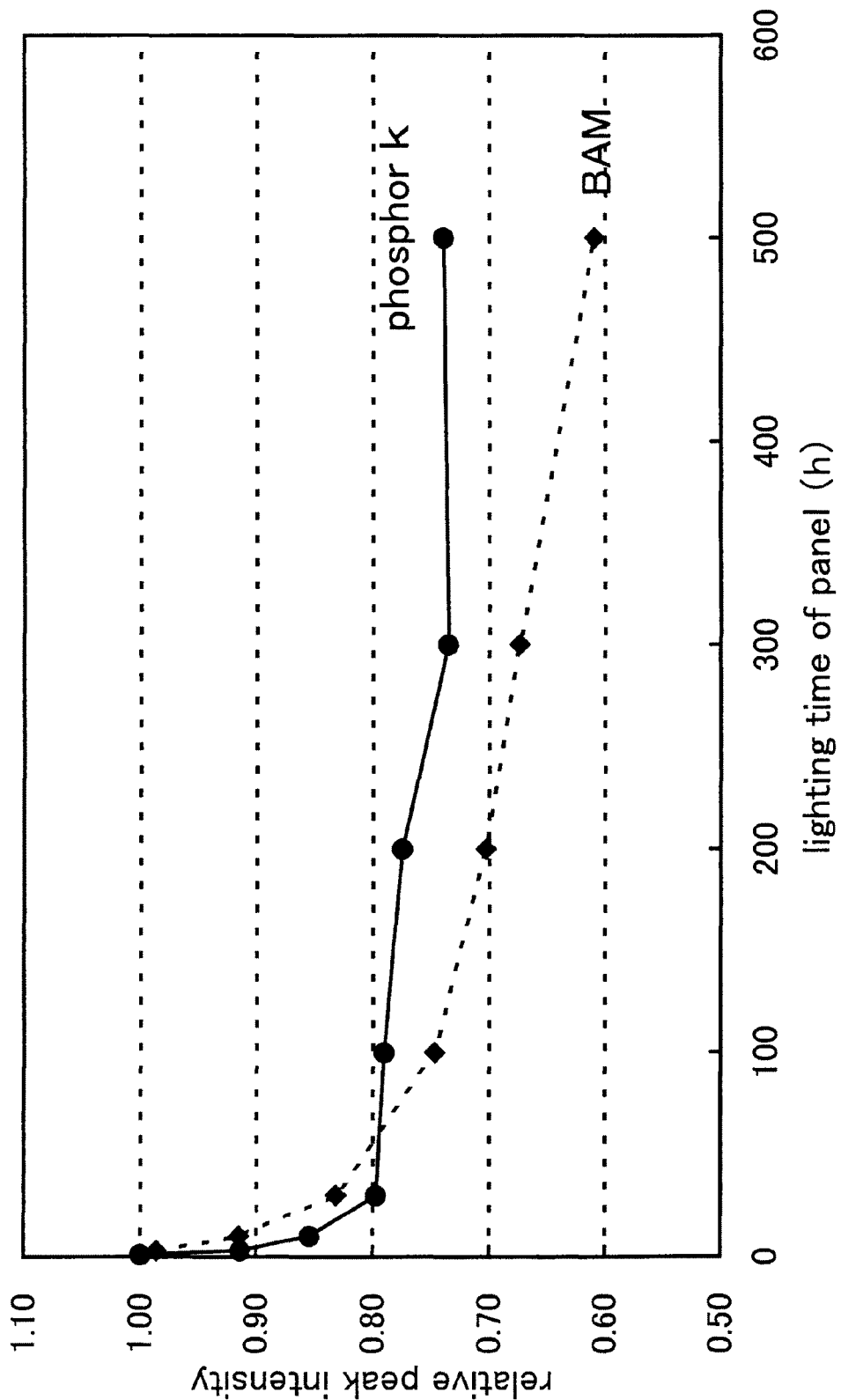
FIG. 6 is a graph for showing the relationship between the lighting time and the peak intensity in Example 3.

From FIG. 6, it is found that the phosphor "k" has a longer lifetime than BAM.

INDUSTRIAL APPLICABILITY

Display characteristics of a display device such as a PDP, a CRT, a fluorescent display tube, and an x-ray pickup tube can be improved by using a green phosphor in the present invention that is superior in characteristics such as color purity, luminance and lifetime, especially color purity.

What is claimed is:

1. A display device comprising at least one phosphor layer, the phosphor layer containing a green phosphor represented by the following formula:

$$(A_{1-x}B_x)(Zn_{1-y}Mn_y)Al_{10}O_{17}$$

wherein,
A is at least one element selected from Ca, Ba and Sr,
B is a rare-earth element selected from Gd, Lu, Yb and Y,
x is a number satisfying $0.0001 \leq x \leq 0.1$, and
y is a number satisfying $0.02 \leq y \leq 0.14$.

2. A display device according to claim 1, wherein the green phosphor is represented by the following formula:

$$(Ba_{1-z-x}Sr_zB_x)(Zn_{1-y}Mn_y)Al_{10}O_{17}$$

wherein, B, x and y are the same definition as described above, and z is a number satisfying $0<z<1$.

3. A display device according to claim 1, wherein the green phosphor emits a green fluorescence by the irradiated light of a vacuum ultraviolet ray.

4. A green phosphor represented by the following formula:

$$(A_{1-x}B_x)(Zn_{1-y}Mn_y)Al_{10}O_{17}$$

wherein, A is an element selected from Ca, Ba and Sr, B is a rare-earth element selected from Gd, Lu, Yb and Y, x is a number satisfying $0.0001 \leq x \leq 0.1$, and y is a number satisfying $0.02 \leq y \leq 0.14$.

5. A green phosphor represented by the following formula:

$$(A_{1-x}B_x)(Zn_{1-y}Mn_y)Al_{10}O_{17}$$

wherein, A is at least one element selected from Ca, Ba and Sr, B is a rare-earth element selected from Gd, Lu, Yb and Y, x is a number satisfying $0.0001 \leq x \leq 0.1$, and y is a number satisfying $0.02 \leq y \leq 0.14$.

* * * * *